Patented Aug. 30, 1938

2,128,404

UNITED STATES PATENT OFFICE 2,128,404

COMPOSITION

Norman J. Dunbeck, Eifort, Ohio, assignor to Eastern Clay Products, Inc., Eifort, Ohio, a corporation of Ohio No Drawing. Application November 1, 1937, Serial No. 172,307

7 Claims. (Cl. 22—188)

My invention relates to compositions of matter, especially mold compositions for foundry use.

Among the objects of my invention are the provision of a mold composition of high quality at a minimum of cost which is strong yet permeable to the fumes and gases encountered in actual use, which is readily available and easily handled, which flows freely and readily rams about a pattern, which has a high sintering point, which does not cake or harden in use, which is easily recovered after use and which may be repeatedly employed to give sound high grade castings.

Other objects in part will be obvious and in part pointed out hereinafter.

The invention accordingly consists in the combination of elements, mixture of materials and composition of ingredients, and in the several steps and the relation of each of the same to one or more of the others as described herein, the scope of the application of which is indicated in the following claims.

As conducive to a clearer understanding of certain features of my invention, it may be noted at this point that in heretofore known foundry practices, for example, a certain amount of bonding clay is added to silica sand in forming a mold. In preparing a mold, a small amount of a bonding clay is mixed into clean silica sand. The sand is tempered with water to give a moist workable mass. Where desired, a certain amount of burnt sand is used as a substitute for a part of the clean sand employed.

The mold composition is rammed about a desired pattern, positioned within a molding flask. The clay present in the mold mixture gives strength to the upper half of the mold as contained in the cope in order to prevent breaking or disintegration in separating the mold to remove the pattern. The presence of a large amount of clay, however, is not desired because it decreases the porosity of the mold. This porosity or permeance is essential to a proper elimination of fumes evolved from the contact of hot metal with the mold walls.

The amount of bonding clay employed varies with a number of factors. Fine-grained sands require less binder than coarse sands. Sands consisting of rough irregular grains require less bonding material than do the sands of smooth rounded grains. The nature of the work, too, must be taken into consideration. Small light work can be made with a comparatively weak sand. Large work on the other hand requires a strong mold, since it must possess sufficient strength to be self-sustaining. When a certain amount of burnt, or used, sand is employed, less of the clay is necessary since some clay already is present in the used material. Ordinarily, the amount of bonding clay employed ranges from 10% to 30% of the mass of mold mixture.

At the present time, a number of bonding clays are in use. The fire clays, clays largely comprising kaolinite, but also including montmorillonite and beidellite, probably are in greatest use. Certain of the non-refractory clays have found favor in some classes of work. These clays commonly are of the glacial age and predominate in minerals of the sericite type. Certain stratified clays of greater geological age also are included in this type. In these clays there is a large proportion of the mineral beidellite.

While both the refractory and non-refractory clays are available in numerous localities throughout the United States, only a limited increase in the strength of a mold accompanies their usage. Moreover, the quantity of these clays necessary to achieve a substantial strength is inclined to severely curtail the permeance of the mold. Hence in using these clays, a balance is struck between these factors, the final result achieved being entirely satisfactory from neither standpoint.

The bentonite clays give a desirable high permeability. Certain disadvantages are attendant their usage however. Clays of this sort are found principally in the State of Wyoming and largely consist of the mineral montmorillonite. Such clays are colloidal in character and swell considerably upon being placed in water. The success achieved with this clay is ordinarily attributed to its colloidal properties.

The colloidal character of bentonite causes the mold composition to be somewhat gummy and ram only with difficulty. It possesses a rather low degree of flowability. It is difficult to ram about a pattern. There is no assurance that the detail of the pattern is followed by the mold.

The swelling property in wetting is accompanied by a shrinkage in drying which tends to give fins and scabs on castings made in the mold. Moreover the hardening of the mold from heating renders the flasks difficult to shake out. This property also frequently causes a cracking of the castings, especially in malleable foundry practices, because of a failure of the sand, in an interior section, to collapse upon cooling. In addition, the same, after usage, is lumpy and much is lost in screening operations along with core butts, wedges and other refuse.

In spite of the advantage of high green strength and porosity obtainable in a mold using bentonite as a binder, the certain disadvantages noted, together with the element of cost in handling and transporting the Wyoming bentonite are such as to largely restrict its use in the eastern part of the country. It appears that the differential in efficacy as a binder over the more readily available materials does not warrant the expense involved.

One of the objects of my invention, therefore, is the provision of a mold composition which is inexpensive and readily obtainable in the East, which is easily rammed about a pattern, which lends great green strength to a mold without an objectionably high dry strength, which in use materially lessens the limiting effect on porosity encountered with heretofore known ingredients, which causes no objectionable contraction of the mold at high temperatures, and which does not greatly decrease the sintering point of the mold composition after use.

Referring now to the practice of my invention, I have found that a mold composition comprising silica sand and a non-swelling montmorillonite clay known as Porter's Creek clay possesses many surprising characteristics as appears more fully hereinafter. It is to be noted at this point that the term "non-swelling", as applied to montmorillonite clays, has a definite significance to geologists, ceramic engineers, physicists and chemists. Now all clays are known to swell to some extent when placed in water. These are taken to be essentially non-swelling, however. A swelling clay is characterized by Wyoming bentonite. The distinguishing and identifying feature of Wyoming bentonite or montmorillonite is the tremendous swelling which takes place on addition of water. Swelling bentonites will form a stiff gel with ten times their own weight of water. These are considered to be swelling montmorillonite clays. The non-swelling montmorillonite clays are those which may exhibit some slight swelling but not of the same order as the true swelling bentonites of Wyoming.

Porter's Creek clay is found in the Mississippi Embayment area. It is of the Eocene series, tertiary system and Cenozoic era. In the eastern embayment area the clay extends through Illinois, Kentucky, Tennessee, Mississippi and Alabama, as shown in the geological chart appearing on page 30 of Bulletin No. 30 of the Mississippi Geological Survey. In the western embayment area it is found in Missouri, Arkansas and other States. A description of the properties of the clay is found in Report of Investigations No. 26 of the Illinois Geological Survey. The clay is discussed in various publications of the State Geological Surveys of Missouri, Kentucky, Tennessee and Alabama, as well as Illinois and Mississippi as noted.

The chemical analysis of a typical sample of Porter's Creek clay, as taken from the Illinois Report, is as follows:

| | Per cent |
|---|---|
| $SiO_2$ | 55.42 |
| $Al_2O_3$ | 15.61 |
| $Fe_2O_3$ | 3.55 |
| $FeO$ | .20 |
| $MgO$ | 1.46 |
| $CaO$ | .94 |
| $Na_2O$ | Trace |
| $K_2O$ | 1.41 |
| $H_2O-$ | 6.35 |
| $H_2O+$ | 14.28 |
| $TiO_2$ | .46 |
| $P_2O_5$ | .26 |
| Total | 99.94 |

At present the clay is being obtained in Southern Illinois. The clay largely consists of the mineral montmorillonite. It is not colloidal, however, since it is seen readily to settle out of solution. It does not swell upon being added to water. Neither does it shrink and crack upon drying. The clay, furthermore, is found to be non-plastic. While certain of these properties suggest the unfitness of the clay for foundry use, the exact opposite has been found by actual use. My composition, comprising silica sand and Porter's Creek clay gives highly satisfactory results.

In practicing my invention, there is added to clean silica sand, or to silica sand including a certain proportion of burnt sand as desired, Porter's Creek clay in the amount of about 5% by weight. Preferably the clay is in a dry pulverulent condition. The whole is mixed in the usual foundry mixers to obtain a fairly uniform constituency. Water is then added in desired amount, ordinarily about 3½% by weight. The mixing is continued, giving a uniform mix of desired strength. This mold mix is then used in preparing a sand mold in accordance with well known methods. It appears that upon the addition of water a slurry is formed which coats the individual grains of sand.

The mold composition is easily handled. It is not gummy or sticky. It flows freely. It is readily rammed about a pattern using a conventional jolt machine. The sand packs tightly about the pattern. A smooth surface results accurately following the details of the pattern. The mold is strong and durable. It is well retained in the cope as it is lifted from the drag to remove the pattern. The mold from which the pattern is withdrawn is clean-cut and free of edge breaks and cracks. A minimum of repair to the mold before use, therefore, is required. At the same time, however, the mold is porous and readily permeable to the fumes and gases encountered in actual practical use.

My mold composition, in addition to the novel properties noted above, is strong and well fitted for present-day mold requirements. Actual tests show an increase in strength over heretofore known mold compositions of some 75% to 175%. This is surprising indeed in view of the non-plastic character of the clay itself as noted above.

A mold made with my composition is resistant to heat and "burning on" of sand particles to the casting because of the high sintering temperature of 2600° F. as compared with 2300 to 2400° F. The formed casting, therefore, is free of fins, scabs, and like imperfections found in heretofore known products. The dry strength is of moderate value being only about 40% of a mold using bentonite as a binder. For this reason, the sand readily may be shaken out the flask and recovered for further use. Savings in cleaning the castings are directly realized. Sand in interior sections collapses permitting ready contraction of the metal in cooling and assuring freedom from cracking of the piece.

A certain improved bonding strength with its many attendant advantages is had in my mold composition by including in the bonding ingredients a certain small amount of a sodium salt, say about ½% to 8% and preferably about 3% or 4% of the bonding clay. Improved results are found with such sodium salts as sodium carbonate and sodium bicarbonate; sodium silicate, ortho-silicate and metasilicate; and the sodium phosphates, such as sodium pyrophosphate, disodium phosphate and trisodium phosphate, either in the crystalline or anhydrous form. Good results also are had with an addition of lye in the amount of about 2% of the weight of the clay.

Thus, it will be seen that there has been provided in my invention a composition and art of employing the same in which the various objects hereinbefore noted together with many thoroughly practical advantages are successfully achieved. It will be seen that my bonding composition is well adapted to withstand the many varying conditions of actual operational use in many applications, particularly as a binder in sand mold compositions.

While as illustrative of the practice of my invention, description is made of a green sand mold, it is to be particularly understood that certain beneficial results are had in a dry sand mold. Also, it will be understood that the various ingredients going to make up the mold composition may be mixed together in any desired sequences.

Similarly while the amount of clay, or bonding material, is illustratively given as about 5% of the weight of sand with which it is mixed, it will be understood that good results are obtained when the amount of the bonding clay ranges from about 2% to 8% of the sand weight. In fact these proportions can be extended to ½% to 8% where a part of the sand consists of burnt sand since the bonding clay is reversible in character and can be used over again.

Although as illustrative of my invention a mold, comprising silica sand and Porter's Creek clay is described, my invention is applicable to like combinations of sand and clay for other foundry uses. These include the preparation of facing sands which may consist of various combinations of new silica sand, burnt silica sand, new molding sand, burnt molding sand, lake sand or bank sand together with the bonding clay, to which may be added auxiliary binders in small quantities, such as cereal binders, cement, goulac, pitch or rosin and a casting cleaning element such as sea coal, wood flour or oils. Foundry sand compositions, comprising known sands and Porter's Creek clay are found to possess a certain superior strength as compared to known compositions. In these the Porter's Creek clay is directly added to foundry sands of any type which require strengthening by placing the necessary quantity of clay composition on each mold, by feeding it directly into sand handling systems, by spreading it over sand heaps or any other of the methods in common use.

As many possible embodiments may be made of my invention and as many changes may be made in the embodiments hereinbefore set forth, it is to be understood that all matter described herein is to be interpreted illustratively and not in a limiting sense.

I claim:

1. In a composition of matter, a mold composition comprising in combination, sand and a non-swelling clay of which montmorillonite is a large constituent.

2. In a composition of matter, a mold composition comprising in combination, silica sand, and a non-swelling, non-plastic clay largely comprising montmorillonite.

3. In a composition of matter, a mold composition comprising in combination, sand, and Porter's Creek clay.

4. In a composition of matter, a mold composition comprising in combination, approximately, 95 per cent silica sand and 5 per cent Porter's Creek clay.

5. In preparing a mold for foundry purposes, the art which includes mixing with silica sand, a non-swelling, non-plastic clay largely comprising montmorillonite.

6. In a composition of matter, a mold composition comprising in combination, sand, one of the group of sodium carbonates, sodium silicates and sodium phosphates, and Porter's Creek clay.

7. In preparing a mold for foundry purposes, the art which includes mixing with silica sand, Porter's Creek clay including ½ per cent to 8 per cent by weight of clay of one of the group of sodium carbonates, sodium silicates and sodium phosphates.

NORMAN J. DUNBECK.